US008806147B2

(12) United States Patent
Tierney et al.

(10) Patent No.: US 8,806,147 B2
(45) Date of Patent: Aug. 12, 2014

(54) SYSTEM AND METHOD FOR CREATING ORDERING POINTS

(75) Inventors: Gregory Edward Tierney, Chelmsford, MA (US); St phen R. Van Doren, Northborough, MA (US); Simon C. Steely, Jr., Hudson, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/338,781

(22) Filed: Dec. 28, 2011

(65) Prior Publication Data

US 2012/0137080 A1 May 31, 2012

Related U.S. Application Data

(62) Division of application No. 10/760,652, filed on Jan. 20, 2004, now Pat. No. 8,090,914.

(51) Int. Cl.
*G06F 12/00* (2006.01)
*G06F 12/08* (2006.01)

(52) U.S. Cl.
CPC ........ *G06F 12/0831* (2013.01); *G06F 12/0828* (2013.01); *G06F 2212/2542* (2013.01)
USPC ........... 711/145; 711/133; 711/144; 711/146; 711/E12.033; 709/212; 707/102

(58) Field of Classification Search
CPC ............ G06F 12/0806; G06F 12/0808; G06F 12/0811; G06F 12/0815; G06F 12/0817; G06F 12/0893; G06F 12/0828
USPC .......... 711/144, E12.037, 145, 133, 212, 102, 711/146, E12.033
See application file for complete search history.

(56) References Cited

U.S. PATENT DOCUMENTS

| | | | |
|---|---|---|---|
| 7,177,987 B2 | 2/2007 | Van Doren | |
| 8,145,847 B2 | 3/2012 | Van Doren | |
| 8,176,259 B2 | 5/2012 | Van Doren | |
| 8,468,308 B2 | 6/2013 | Steely, Jr. | |
| 2002/0129211 A1 | 9/2002 | Arimilli | |
| 2004/0002992 A1 | 1/2004 | Cypher | |
| 2005/0251631 A1 | 11/2005 | Rowlands | |

OTHER PUBLICATIONS

U.S. Appl. No. 10/760,436, Notice of Allowance dated Nov. 22, 2006 (8 pages).
U.S. Appl. No. 10/760,436, Non-Final Rejection dated May 23, 2006, pp. 1-13 and attachments.
U.S. Appl. No. 10/760,640, Notice of Allowance dated Feb. 1, 2012 (7 pages).
U.S. Appl. No. 10/760,813, Notice of Allowance dated Feb. 17, 2012 (7 pages).
U.S. Appl. No. 10/760,659, Notice of Allowance dated Mar. 22, 2013 (8 pages).

*Primary Examiner* — Mardochee Chery

(57) ABSTRACT

A system comprises a first node operative to provide a source broadcast requesting data. The first node associates an F-state with a copy of the data in response to receiving the copy of the data from memory and receiving non-data responses from other nodes in the system. The non-data responses include an indication that at least a second node includes a shared copy of the data. The F-state enabling the first node to serve as an ordering point in the system capable of responding to requests from other nodes in the system with a shared copy of the data.

18 Claims, 5 Drawing Sheets

SYSTEM AND METHOD FOR CREATING ORDERING POINTS

RELATED APPLICATIONS

This application is a divisional of U.S. application Ser. No. 10/760,652, filed Jan. 20, 2004, U.S. Pat. No. 8,090,914; and is related to the following patent applications:

U.S. application Ser. No. 10/760,640 filed Jan. 20, 2004, U.S. Pat. No. 8,145,847; U.S. application Ser. No. 10/760,813 filed Jan. 20, 2004, U.S. Pat. No. 8,176,259; U.S. application Ser. No. 10/761,048 filed Jan. 20, 2004, U.S. Pat. No. 7,818,391; U.S. application Ser. No. 10/760,599 filed Jan. 20, 2004, U.S. Pat. No. 7,769,959; U.S. application Ser. No. 10/760,651 filed Jan. 20, 2004, U.S. Pat. No. 7,395,374; U.S. application Ser. No. 10/761,044 filed Jan. 20, 2004, U.S. Pat. No. 7,143,245; U.S. application Ser. No. 10/761,034 filed Jan. 20, 2004, U.S. Pat. No. 7,149,852; U.S. application Ser. No. 10/760,659 filed Jan. 20, 2004, U.S. Pat. No. 8,468,308; U.S. application Ser. No. 10/761,073 filed Jan. 20, 2004, U.S. Publication No. 20050160238, now abandoned; U.S. application Ser. No. 10/761,047 filed Jan. 20, 2004, U.S. Pat. No. 7,620,696; and U.S. application Ser. No. 10/760,436 filed Jan. 20, 2004, U.S. Pat. No. 7,177,987, all of which are incorporated herein by reference.

BACKGROUND

Multiprocessor systems employ two or more computer processors that can communicate with each other, such as over a bus or a general interconnect network. In such systems, each processor may have its own memory cache (or cache store) that is separate from the main system memory that the individual processors can access. Cache memory connected to each processor of the computer system can often enable fast access to data. Caches are useful because they tend to reduce latency associated with accessing data on cache hits, and they work to reduce the number of requests to system memory. In particular, a write-back cache enables a processor to write changes to data in the cache without simultaneously updating the contents of memory. Modified data can be written back to memory at a later time.

Coherency protocols have been developed to ensure that whenever a processor reads a memory location, the processor receives the correct or true data. Additionally, coherency protocols help ensure that the system state remains deterministic by providing rules to enable only one processor to modify any part of the data at any one time. If proper coherency protocols are not implemented, however, inconsistent copies of data can be generated.

There are two main types of cache coherency protocols, namely, a directory-based coherency protocol and a broadcast-based coherency protocol. A directory-based coherency protocol associates tags with each memory line. The tags can contain state information that indicates the ownership or usage of the memory line. The state information provides a means to track how a memory line is shared. Examples of the usage information can be whether the memory line is cached exclusively in a particular processor's cache, whether the memory line is shared by a number of processors, or whether the memory line is currently cached by any processor.

A broadcast-based coherency protocol employs no tags. Instead, in a broadcast-based coherency protocol, each of the caches monitors (or snoops) requests to the system. The other caches respond by indicating whether a copy of requested data is stored in the respective caches. Thus, correct ownership and usage of the data are determined by the collective responses to the snoops.

SUMMARY

One embodiment of the present invention may comprise a system that includes a first node operative to provide a source broadcast requesting data. The first node associates an F-state with a copy of the data in response to receiving the copy of the data from memory and receiving non-data responses from other nodes in the system. The non-data responses include an indication that at least a second node includes a shared copy of the data. The F-state enables the first node to serve as an ordering point in the system capable of responding to requests from the other nodes in the system with a shared copy of the data.

Another embodiment of the present invention may comprise a multiprocessor network that includes a plurality of processor nodes in communication with each other. At least a first node of the plurality of processor nodes includes a copy of data associated with a given address that is also shared with memory. The first node operates in a first state that causes the first node to respond to a non-ownership request from a second node of the plurality of processor nodes for the data by (i) sending a response to the second node that includes a shared copy of the data, and (ii) transitioning from the first state to a second state indicating that the data is shared. The second node transitions to a third state in response to receiving the shared copy of the data from the first node, such that the second node becomes an ordering point in the network for providing a shared copy of the data.

Yet another embodiment of the present invention may comprise a computer system that includes a plurality of processors comprising a source processor that issues broadcast request for desired data while in a first state and at least one target processor having an associated cache that includes a shared copy of the desired data. The at least one target processor responds to the broadcast request with a response indicating that the at least one second processor includes the shared copy of the desired data. Memory stores the desired data, the memory responding to the broadcast request with a response that includes a copy of the desired data. The source processor transitions from the first state to a second state in response to receiving the responses from the memory and the at least one target processor. The second state enables the first processor to respond to requests from other of the plurality of processors with a copy of the desired data.

Still another embodiment of the invention may comprise a method that includes broadcasting a read request for data from a source node to other nodes of an associated system. The source node transitions into an F-state in response to receiving data from memory and receiving non-data responses from other target nodes in the system indicating that the data is shared with at least one of the other target nodes. The method also includes enabling the source node, while in the F-state, to serve as an ordering point that is capable of responding to non-ownership requests for the data by providing a shared copy of the data.

DETAILED DESCRIPTION

This disclosure relates generally to a coherency protocol that employs a cache state (the "F-state") that has a special property whereby a node in the F-state is the only copy that is allowed to respond with data in response to a request. This F-state can be used even if more than one node includes a shared copy of the data. A node that provides a source broadcast request can enter the F-state to define an ordering point in the network where data is received from memory and a shared copy exists in at least one other node of the network. The F-state can remain at the node or the F-state can migrate to other nodes. The F-state is useful in multiprocessor systems employing a broadcast protocol, as well as a hybrid cache coherency protocol, such as a snoop-based protocol implemented in conjunction with a directory-based protocol. In such a hybrid system, the use of the F-state can reduce the latency associated with accessing data, as described herein.

Figure 1:
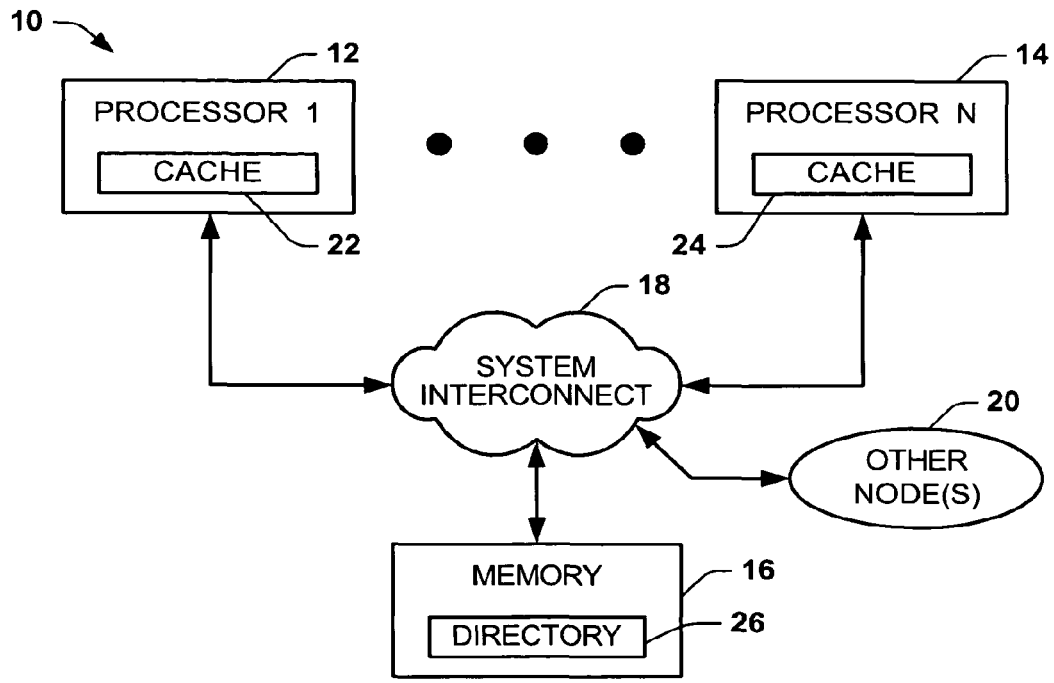
FIG. 1 depicts an example of a multiprocessor system.

FIG. 1 depicts an example of a system 10 that can be utilized to create an ordering point for a non-ownership request. As used herein, an ordering point defines a serialization of requests to the same memory line (or memory block) that is understood and followed by the system (e.g., an ordering point can respond to requests). The system 10 illustrates a multi-processor environment that includes a plurality of processors 12 and 14 (indicated at PROCESSOR 1 through PROCESSOR N, where N is a positive integer (N>1)). The system 10 also includes memory 16, which can be implemented as a globally accessible aggregate memory. For example, the memory 16 can include one or more memory storage devices (e.g., dynamic random access memory (DRAM)).

The processors 12; 14 and memory 16 define nodes in the system that can communicate with each other via requests and corresponding responses through a system interconnect 18. For example, the system interconnect 18 can be implemented as a switch fabric or a hierarchical switch. Also associated with the system 10 can be one or more other nodes, indicated schematically at 20. The other nodes 20 can correspond to one or more other multi-processor systems connected to the system interconnect 18, such as through an appropriate interconnect interface (not shown).

Each of the processors 12 and 14 includes at least one corresponding cache 22 and 24. For purposes of brevity, each of the respective caches 22 and 24 are depicted as unitary memory devices, although they may include a plurality of memory devices or different cache levels. Each of the caches 22 and 24 contains a plurality of cache lines. Each cache line has an associated address that identifies corresponding data stored in the line. The cache lines can also include information identifying the state of the data for the respective lines.

The system thus employs the caches 22 and 24 and the memory 16 to store blocks of data, referred to herein as "memory blocks." A memory block can occupy part of a memory line, an entire memory line or span across multiple lines. For purposes of simplicity of explanation, however, it will be assumed in this description that a "memory block" occupies a single "memory line" in memory or a "cache line" in a cache. Additionally, a given memory block can be stored in a cache line of one or more caches as well as in a memory line of the memory 16.

The system 10 implements a cache coherency protocol to manage the sharing of memory blocks so as to ensure coherence of data. The cache coherency protocol of the system 10 utilizes a plurality of states to identify the state of each memory block stored in a respective cache line and the memory 16. The coherency protocol establishes rules for transitioning between states, such as if data is read from or written to memory 16 or one of the caches 22 and 24.

As used herein, a node that issues a request, such as a read or write request, defines a source node. Other nodes within the system 10 are potential targets of the request. Additionally, each memory block in the system 10 can be assigned a "home node" that maintains necessary global information and a data value for that memory block.

For example, when a source node, such as the processor 12, requires a copy of a given memory block, the processor typically first requests the memory block from the processor's local, private cache by identifying the address associated with the memory block. If the data is found locally, the memory access is resolved without communication via the system interconnect 18. When the requested memory block is not found locally, the source node 12 can request the memory block from the system 10, including the memory 16. In addition to the request identifying an address associated with the requested memory block, the request usually identifies the type of request or command being issued by the requester. Whether the other nodes 14 and the memory 16 will return a response depends upon the type of request, as well as the state of the identified memory block contained in the responding nodes. The protocol implemented by the system 10 defines the available states and possible state transitions.

A set of cache states that can be implemented by the system 10 for a respective cache line is depicted below in Table 1. Since there are five possible states, the state information can be encoded by a three-bit data word, for example.

TABLE 1

| STATE | DESCRIPTION |
|---|---|
| I | Invalid - The cache line does not exist. |
| S | Shared - The cache line is valid and unmodified by caching processor. Other processors may have valid copies, and the caching processor can not respond to snoops by returning data. |
| E | Exclusive - The cache line is valid and unmodified by caching processor. The caching processor has the only cached copy in the system and may respond to snoops by returning data. |
| F | First (among equals) - The cache line is valid and unmodified by caching processor. Other processors may have valid copies, and caching processor may respond to snoops by returning data. |
| M | Modified - The cache line is valid and has been modified by the caching processor. The caching processor has the only cached copy in the system, and the caching processor must respond to snoops by returning data and must write data back to memory upon displacement. |

As mentioned above, copies of the same data can exist in cache lines of different processor nodes 12 and 14. Shared copies of a memory block can co-exist in different caches of the system in the S-state. With the protocol employing the states defined in Table 1, the cache containing a cache line in the S-state cannot respond to requests by returning data associated with the cache line. Instead, a node containing data in an S-state responds to a non-ownership request by returning a non-data shared response, indicating that the cache contains a shared copy of data, and the node can remain in the S-state.

By way of example, assume that the processor 12 (a source node) requires a copy of data associated with a particular address, and assume that the data is unavailable from its own local cache 22. Since the processor 12 does not contain a copy of the requested data, the processor is initially in the I-state (invalid) for that data. Since the processor 12 is unable to access the data in its local cache 22, the processor 12, as the source node, transmits a source broadcast request to other nodes and memory 16 via the system interconnect 18.

For example, the request can correspond to a source broadcast read request for a memory block associated with the address identified in the request. The request also can identify what type of request is being issued by source node 12 (e.g., Is the request a non-migratory read request, a migratory read request, a read current request, or a read-modify (to acquire ownership), etc.?). In this example, the broadcast request is transmitted from the source processor 12 to all other processors 14 in the system 10, including those located in the other nodes 20, as well as to the memory 16. In this example, it is assumed that the request is non-ownership request for the data and at least one other processor (e.g., processor 14) in the system 10 includes a shared copy of the requested data (e.g., the processor 14 is in the S-state). By non-ownership request, it is meant that the requester does not require the ability to modify the requested data (e.g., including most read commands for a non-exclusive copy). Thus, the processor 14 provides a non-data response indicating that the processor contains a shared copy of the requested data. Those skilled in the art will appreciate that such a response may require substantially less bandwidth than a data response (e.g., the response may only contain from about 8 to about 25 bytes of data, whereas a typical data response can contain about 128 bytes or more).

The memory 16 also responds to the request by returning a copy of the requested data to the processor 12. In response to receiving the data from the memory and all other responses being shared or miss responses, the processor 12 can transition from its present I-state to an F-state for the associated data. A miss can be provided by a target that does not contain a cache line or MAF entry that matches the address provided in a request. With the data existing in the cache 22 of the processor 12 in the F-state, the processor 12 can access the data for read-only access. In addition, the cache 22 of the processor 12, while in the F-state, will subsequently serve as an ordering point for new requests for such data from other processors. As such the processor 12 can respond to broadcast requests for the data by providing a shared copy of the data. As a result, the requester can obtain a read-only copy of the data without having to access the system memory 16.

As noted in Table 1 above, the F-state corresponds to a shared cache line that can respond to requests for data with a response that includes a shared copy of the requested data. Additionally, the F-state can be silently evicted (transitioning to the I-state with no copy being written to memory) from the cache 22. When an F-state is silently evicted from the cache 22, the system 10 will still include an up-to-date memory version of the line stored in the memory 16, but the other caches will be either in the S-state or the I-state for the cache line.

Additionally, a cache line can transition into an F-state without creating an ordering point. For example, a cache line in a target processor in the E-state can transition from the E-state to the F-state in response to a source broadcast read request for the data, and concurrently provide a response including a shared copy of the requested data to the source processor. The recipient of the shared data (the source processor) in turn transitions to the S-state. The previous description sets forth examples in which an ordering point is created when there are no cache copies existing in an F or E (or M) state. In this approach, an existing ordering point (F, E, or M) does not migrate from a target processor to the source processor unless an explicit ownership request is broadcast from the source. Accordingly, this approach can be referred as non-migratory.

Alternatively, the coherency protocol can provide for the cache ordering point to migrate from a target processor to a source processor in response to a request for the data corresponding to the ordering point. In a migratory implementation, the cache line having the F-state transitions to an S-state in response to providing a shared copy of data to a requester that provided a source broadcast request for the associated data. Additionally, the cache line having the E-state transitions to an S-state in response to providing a shared copy of data to a requester that provided a source broadcast request for the associated data. The requester who receives the shared copy of the data transitions to the F-state to then serve as the ordering point for subsequent requests for the data. The F-state can continue to migrate with the shared data until the data is evicted.

Continuing with the above example, assume that the cache line of the cache 22, presently in the F-state, is silently evicted. This silent eviction can correspond to a situation where the processor 12 no longer requires the data, yet requires use of the cache line in which the data is stored. As noted above, however, an up-to-date copy of the data will be maintained in the memory 16. Assuming that at least one other shared copy of the data still exists in the cache of at least one other processor of the system 10 (i.e., the other processor is in the S-state), another F-state can be created at a source node that issues a non-ownership source broadcast request for the data. While the F-state exists at a cache line, the associated processor can respond to subsequent requests for the data by returning a shared copy of the data. The processor returning the shared copy of the data can either remain in the F-state or be silently evicted and returned to an I-state.

While the F-state is maintained for a cache line in one of the caches 22 and 24 of the system 10, latency can be decreased for accessing data since the data is obtained directly from an associated cache of another processor and not obtained from the memory 16. For example, read access from memory typically takes approximately 70 nanoseconds (excluding hops through the system), whereas obtaining data from an associated cache can be implemented in about 20-25 nanoseconds. Additionally, a typical access of data from the memory 16 by one of the processors 12 and 14 would usually require a greater number of hops through intervening hardware components as compared to the number of hops required when accessing data from a neighboring cache.

Utilization of an F-state, as described above, is particularly useful in conjunction with a broadcast-based cache coherency protocol, as described herein. A broadcast-based protocol, such as a broadcast source snoopy protocol, broadcasts snoops or requests directly from a source processor to all other processors in the system 10. Broadcast snoops transmitted by the source processor can include read requests, write requests or memory update commands. Since the F-state enables an associated processor to respond to a source broadcast request for corresponding data by sending a response that includes a shared copy of the data, overall latency can be reduced relative to a corresponding memory access for the data.

In addition to a processor in the F-state (a target node) providing a shared copy of the data to a requester (or source node), the processor in the F-state can also transmit a non-data (low bandwidth) instruction to block the memory 16 from issuing a data response to the requester. Provided that the block command is received at the memory 16 prior to the source broadcast request for such data, the memory 16 can issue an acknowledgement (e.g., a non-data (low bandwidth) response) to the requester. The acknowledgement indicates that the cache of an associated processor in the F-state is providing the data response. Since creation of an F-state in a cache is facilitated in the system 10, including after the F-state data has been evicted from an associated cache, forward progress can be facilitated to ensure that requests succeed in the system 10 (e.g., without deadlocking).

The F-state enables conflicting read requests to succeed without having to involve a more robust forward progress protocol. In the event that the source-broadcast request cannot result in a cache hit, such as due to a conflict, the system 10 can transfer to an associated forward progress protocol also being implemented by the system 10. The forward progress protocol can then be utilized to process the request accordingly. For example, the memory 16 can include a directory 26 that identifies where the home node is for each memory address. Thus, in response to a data request while the system operates using the forward progress protocol, the memory 16 can snoop the home node for the requested data, which can provide the data to the requester. Those skilled in the art will appreciate various forward progress protocols, such as a null directory or other directory-based protocol, that can be utilized in conjunction with the source broadcast (or source-snoopy) protocol described herein.

Figure 2:
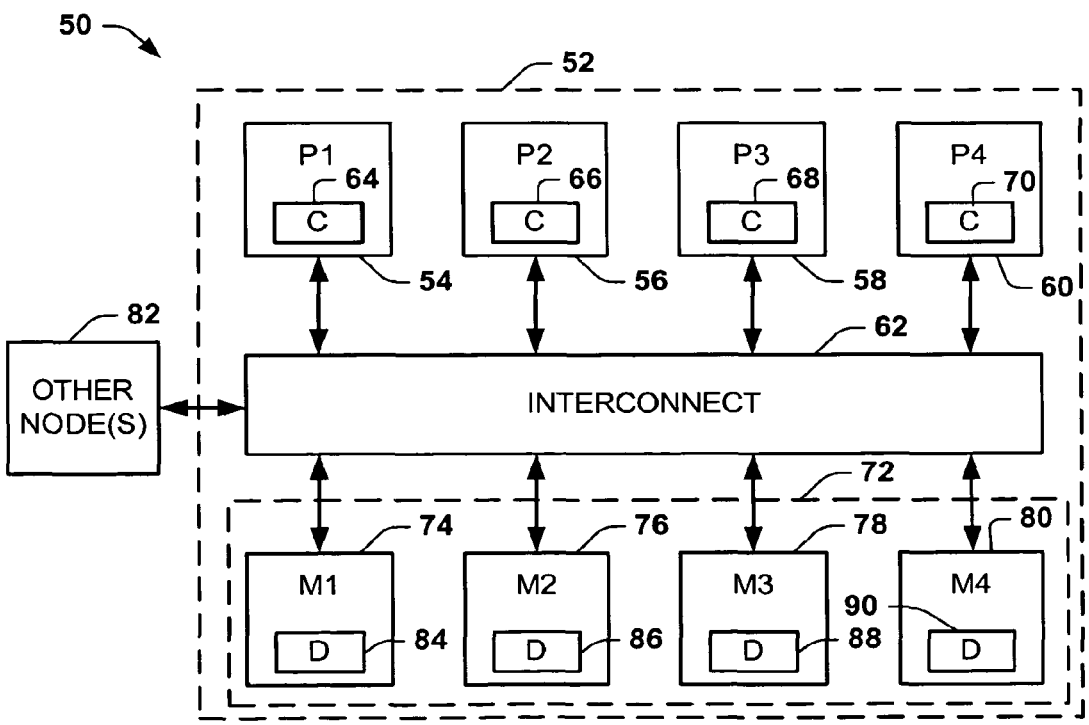
FIG. 2 depicts an example of another multiprocessor system.

FIG. 2 depicts an example of a multiprocessor computing system 50. The system 50, for example, includes an SMP (symmetric multi-processor) node 52 that includes processors (P1, P2, P3, P4) 54, 56, 58 and 60 in communication with each other via an interconnect 62. The interconnect 62 facilitates transferring data between processors and memory of the system 50. While four processors 54, 56, 58 and 60 are depicted in the example of FIG. 2, those skilled in the art will appreciate that a greater or smaller number of processors can be implemented in the node 52.

Each processor 54, 56, 58 and 60 also includes an associated cache 64, 66, 68 and 70. The caches 64, 66, 68 and 70 can enable faster access to data than from an associated main memory 72 of the node 52. The system 50 implements a cache coherency protocol designed to ensure coherency of data in the system. By way of example, the cache coherency protocol can be implemented to include a source broadcast protocol in which broadcast snoops or requests for data are transmitted directly from a source processor to all other processors and memory in the system 50. The source broadcast protocol can further be implemented in conjunction with another forward progress protocol, such as a null-directory or other directory-based protocol. The system 50 of FIG. 2, for example, employs the source broadcast protocol to process a request for data. If the request cannot be processed using the source broadcast protocol, such as where a conflict exists, the system 50 transfers to its forward progress protocol.

The memory 72 can include multiple memory modules (M1, M2, M3, M4) 74, 76, 78 and 80. For example, the memory 72 can be organized as a single address space that is shared by the processors 54, 56, 58 and 60 as well as other nodes 82 of the system 50. Each of the memory modules 74, 76, 78 and 80 can include a corresponding directory 84, 86, 88 and 90 that defines how the memory blocks are apportioned in each respective module as well as where the corresponding coherent copy of the data should reside in the system 50. Alternatively, the memory modules may contain no directories. A coherent copy of data, for example, may reside in a home node (e.g., associated with a given memory module) or, alternatively, in a cache of one of the processors 54, 56, 58 and 60.

The other node(s) 82 can include one or more other SMP nodes associated with the SMP node 52 via the interconnect 62. For example, the interconnect 62 can be implemented as a switch fabric or hierarchical switch programmed and/or configured to manage transferring requests and responses between the processors 54, 56, 58 and 60 and the memory 70, as well as those to and from the other nodes 82.

When a processor 56 requires desired data, the processor 56 operates as a source node and issues a source broadcast snoop (e.g., a broadcast read or write request) to all other processors 54, 58 and 60 as well as to memory 72 via the interconnect 62. The cache coherency protocol implemented in the system 50 is designed to ensure that a correct copy of the data is returned in response to the source broadcast snoop.

For example, the processor 56 broadcasts a snoop request via the interconnect 62 and receives corresponding data from the home memory 76. At least one of the responses received from the other processors 54, 58 and 60 is a non-data response indicating the data is shared. Other non-data responses indicate that a valid copy of the requested data does not exist at such processors. These collective responses result in the cache line of the cache 66 that receives the requested data being set to the F-state. With the cache 66 maintaining an F-state for the data received from memory, the cache 66 is now capable of responding to requests for such data by issuing a response that includes a shared copy of the data to one or more requesting processors 54, 58 or 60. Additionally, the cache 66 can also provide a shared copy of the data, presently in the F-state, to processors associated with the other nodes 82.

Once a cache line in a cache is in the F-state, the associated processor can silently evict the data, such as by transitioning the state of the cache line to an I-state. As described herein, silent eviction may occur if the processor requires the cache line to store other data or the processor otherwise no longer requires the data. Additionally, the F-state can be migratory or non-migratory depending on how the protocol is implemented. In a non-migratory implementation, the coherency protocol provides that the cache line remain in the F-state until the F-state data is evicted.

In a migratory implementation, the F-state can move from the cache of a target processor to the cache of a source in the system 50 in response to a request for the data corresponding to the ordering point. For example, the cache line having the F-state transitions to an S-state in response to providing a shared copy of data to a requester that provided a source broadcast request for the associated data. Additionally, the cache line having the E-state transitions to an S-state in response to providing a shared copy of data to a requester that provided a source broadcast request for the associated data. The requester (the source node) that receives the shared copy of the data transitions to the F-state to then serve as the ordering point for subsequent requests for the data. The F-state can continue to migrate with the shared data until the data is evicted.

Figure 3:
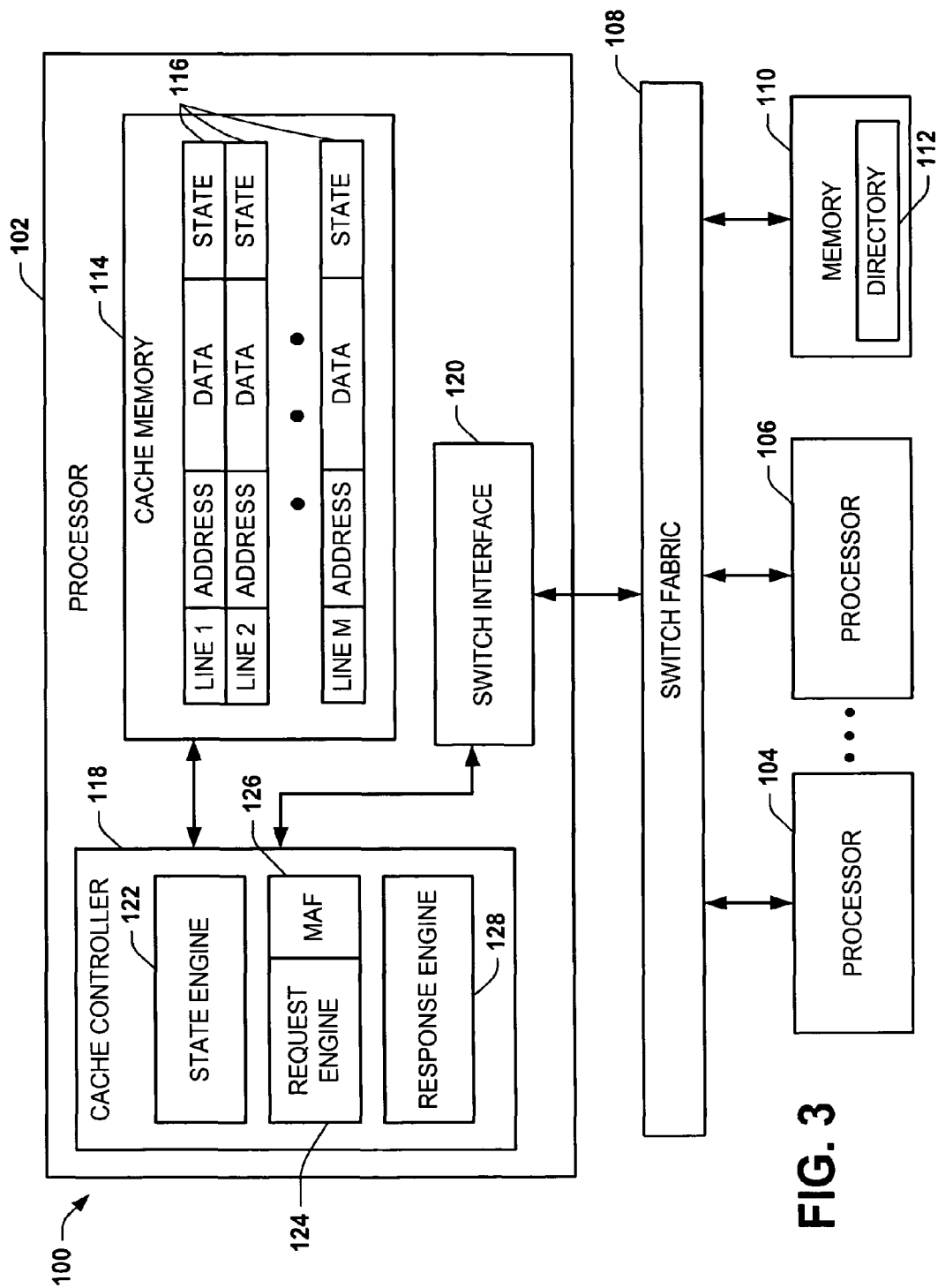
FIG. 3 depicts an example of a processor within a multiprocessor system.

FIG. 3 depicts an example of another multi-processor system 100 that includes a plurality of processors 102, 104 and 106 in communication with each other via a switch fabric 108. The system 100 also includes associated memory 110, which can be organized as a single address space that is shared by the processors 102-106. Alternatively, the memory 110 can be implemented as a plurality of separate memory modules associated with each of the respective processors 102-106 for storing data. The system 100, for example, can be implemented as an integrated circuit or as circuitry containing plural integrated circuits.

The system 100 can employ a source broadcast or source-snoopy cache coherency protocol. For a source-broadcast-based protocol, a source processor 102-106 can issue a source broadcast request to all other processors in the system and to the memory 110. In the event that conflict arises, or the source broadcast request otherwise fails, the system 100 can transfer to a forward-progress protocol, such as a null-directory or other directory-based protocol.

In a null-directory protocol, for example, the memory 110 employs a corresponding directory 112 to ascertain a home for a requested data. Instead of issuing a broadcast to all cache targets, the source issues a single request to the home of such data. In response to receiving the request for memory, the home processor can respond with the data to the requesting processor; although, only after the home processor sends snoop messages to (and receives responses from) all other processors. In a standard directory protocol, there will be times when the directory can indicate that there are no cached copies, and thus the home processor can respond with the data without issuing any snoops to the system. When successful, a snoop broadcast protocol can be implemented with decreased latency relative to the null directory protocol or directory-based protocols. Thus, by combining the two protocols, the system 100 operates in a more robust and efficient manner, as described herein.

The processor 102 includes cache memory 114 that contains a plurality of cache lines (e.g., lines 1-M, where M is a positive integer, M≥1) 116. Each cache line 116 can contain one or more memory blocks. An address (ADDRESS) is associated with the data contained in each cache line 116. Additionally, each cache line 116 can contain state information identifying the state of the data contained at that cache line. Examples of states that can be associated with each cache line 116 are identified above in Table 1.

A cache controller 118 is associated with the cache memory 114. The cache controller 118 controls and manages access to the cache memory, including requests for data and responses. The cache controller 118 communicates requests and responses via a switch interface 120 that is coupled with the switch fabric 108. The switch interface 120, for example, includes an arrangement of queues (e.g., input and output queues) or other data structures that organize both requests and responses issued by the processor 102 as well as requests and responses for execution by the processor.

In the example of FIG. 3, the cache controller 118 includes a state engine 122 that controls the state of each respective line 116 in the cache memory 114. The state engine 122 is programmed and/or configured to implement state transitions for the cache lines 116 based on predefined rules established by the cache coherency protocol implemented in the system 100. For example, the state engine 122 can modify the state of a given cache line 116 based on requests issued by the processor 102. Additionally, the state engine 122 can modify the state of a given cache line 116 based on responses received at the processor 102 for the given address, such as may be provided by another processor 104, 106 and/or the memory 110.

Examples of state transitions that can occur in the system 100 for selected processor commands are provided in Table 2. The commands including the term "broadcast" generally correspond to broadcast snoop commands implemented within the context of the source broadcast protocol. Most of the other commands (excluding the term "broadcast") are examples of typical commands that can be implemented within the context of the forward progress protocol, also implemented by the system 100.

TABLE 2

| Command | Current | | | Next | | | |
|---|---|---|---|---|---|---|---|
| | Source | Owner | Sharer | Source | Owner | Sharer | Memory |
| Broadcast | I | I | I | E or F | I | I | |
| Read line code | I | I | S | F | I | S | |
| | I | E | I | S or F | F or S | I | |
| | I | F | I | S | F | I | |
| | I | F | S | S | F | S | |
| | I | M | I | S | O | I | |
| Broadcast read line data | I | I | I | E | I | I | |
| | I | I | S | F | I | S | |
| | I | E | I | S or F | F or S | I | |
| | I | F | I | S | F | I | |
| | I | F | S | S | F | S | |
| Broadcast non-coherent read | I | I | I | I | I | I | |
| | I | I | S | I | I | S | |
| | I | E | I | I | E | I | |
| | I | F | I | I | F | I | |
| | I | F | S | I | F | S | |
| | I | M | I | I | M | I | |
| Read line code | I | I | I | E or S | I | I | |
| | I | I | S | S | I | S | |
| | I | E | I | S | S | I | |
| | I | F | I | S | S | I | |
| | I | F | S | S | S | S | |
| | I | M | I | S | S | I | Update |
| Read line data | I | I | I | E | S | I | |
| | I | I | S | S | S | S | |
| | I | E | I | S | S | I | |
| | I | F | I | S | S | I | |
| | I | F | S | S | S | S | |
| | I | M | I | E | I | I | Update |

TABLE 2-continued

| Command | Current | | | Next | | | Memory |
|---|---|---|---|---|---|---|---|
| | Source | Owner | Sharer | Source | Owner | Sharer | |
| Broadcast read modify with no update | I | I | I | E | I | I | |
| | I | I | S | E | I | I | |
| | I | E | I | E | I | I | |
| | I | F | I | E | I | I | |
| | I | F | S | E | I | I | |
| Upgrade | F | — | I | E | I | I | |
| | F | — | S | E | I | I | |
| Read modify with no update | I | I | I | E | I | I | |
| | I | I | S | E | I | I | |
| | I | E | I | E | I | I | |
| | I | F | I | E | I | I | |
| | I | F | S | E | I | I | |
| | I | M | I | E | I | I | Update |
| Upgrade unwritable copy | F | — | I | E | I | I | |
| | F | — | S | E | I | I | |
| | S | I | I | E | I | I | |
| | S | I | S | E | I | I | |
| | S | F | I | E | I | I | |
| | S | F | S | E | I | I | |
| Read Modify with update | I | I | I | E | I | I | |
| | I | I | S | E | I | I | |
| | I | E | I | E | I | I | |
| | I | F | I | E | I | I | |
| | I | F | S | E | I | I | |
| | I | M | I | E | I | I | Update |
| Cache flush | * | * | * | I | I | I | Update |
| | M | — | I | I | I | I | Update |
| Broadcast victim write | M | — | I | I | I | I | Update |
| | M | — | S | I | I | S | Update |
| Victim write | M | — | I | I | I | I | Update |

The cache controller 118 also includes a request engine 124. The request engine 124 employs a miss address file (MAF) 126 that contains MAF entries for outstanding requests associated with each line 116 of the cache memory 114. The MAF can be implemented as a table, an array, a linked list or other data structure programmed to manage and track requests for each cache line. For example, when the processor 102 requires data associated with a given address line 116, the request engine 124 creates a corresponding entry in the MAF 126. The MAF entry includes fields that identify, for example, the address of the data being requested, the type of request, and response information received from other nodes in response to the request. The request engine 124 thus employs the MAF 126 to manage requests issued by the processor 102 as well as responses to such requests.

The cache controller 118 also includes a response engine 128 that controls responses provided by the processor 102. The processor 102 provides responses to requests or snoops received via the switch interface 120 from another processor 104-106 or memory 110. The response engine 128, upon receiving a request from the system 100, cooperates with the state engine 122 and the MAF 126 to provide a corresponding response based on the type of request and the state of data contained in the cache memory 114. For example, if a MAF entry exists for an address identified in a request received from another processor or memory, the cache controller can implement appropriate conflict resolution defined by the coherency protocol. The response engine thus enables the cache controller to send an appropriate response to requesters in the system 100. A response to a request can also cause the state engine 122 to effect a state transition for an associated cache line 116.

By way of further example, assume that the processor 102 requires data not contained locally in its cache memory 114. The request engine 124 will create a MAF entry in the MAF 126, corresponding to the type of request and the address associated with data required. The cache controller 118 broadcasts a source snoop (e.g., an XRLD or XRLC instruction) to the system 100 via the switch interface 120 and switch fabric 108. The other processors 104-106 and memory 110 in the system 100 provide corresponding responses. For example, if the processor 104 does not contain a valid copy of the data for the address identified in the read request, the processor returns a corresponding non-data response, such as a miss. As mentioned above, a miss can be provided by a target that does not contain a cache line or MAF entry that matches the address provided in a request. If the processor 106 contains shared copy of the data associated with the address, the processor 106 returns a non-data shared response to the processor 102, indicating the processor 106 has a shared copy of the requested data. Assuming all other processor responses are non-data responses (e.g., shared or misses), the memory 110 will return a response that includes a copy of the data requested by the processor 102. Hence, in this example, the data came from memory 110, and all the other responses were either shared or miss responses. Upon receiving these responses, the request engine 124 writes the data received from memory 110 to a corresponding line 116 of the cache memory 114 and the MAF entry for the request can be removed from the MAF 126. Additionally, the state engine 122 sets the state of the cache line 116 associated with the data received from memory 110 to the F-state.

Since the cache line 116 is now in the F-state, the response engine 128 of the processor 102 is capable of responding to requests (ownership and non-ownership requests) for the data by sending a shared copy of such data to the requester. In one implementation, the cache coherency protocol implemented in the system 100 provides that cache controller 118 maintain the cache line 116 in the F-state for such data, such that the F-state is non-migratory. Alternatively, the cache coherency protocol implemented in the system 100 can provide that the cache controller 118 enable the F-state to be migratory, such as by transitioning its F-state to the S-state when the processor 102 responds to a request with a shared copy of the data. In this latter migratory example, the recipient (i.e., the requester) of the data will transition the state of the cache line associated with the data from the I-state to the F-state. As a result, the ordering point for non-ownership requests for the data can migrate between processor caches.

In view of the foregoing structural and functional features described above, certain methods that can be implemented using a coherency protocol will be better appreciated with reference to FIGS. 4-9. It is to be understood and appreciated that the illustrated actions, in other embodiments, may occur in different orders and/or concurrently with other actions. Moreover, not all illustrated features may be required to implement a method. It is to be further understood that the following methodologies can be implemented in hardware (e.g., as one or more integrated circuits or circuit boards containing a plurality of microprocessors), software (e.g., as executable instructions running on one or more processors), or any combination thereof.

FIGS. 4-8 depict example scenarios that can be implemented in a multi-processor system employing a cache coherency protocol, as described herein. Each of the examples illustrates various interrelationships between requests and responses and state transitions that can occur for a given memory address in different memory devices or caches. In each of these examples, time flows in the direction of an arrow labeled "TIME." Those skilled in the art may appreciate various other cases that can be implemented using the coherency protocols described herein.

Figure 4:
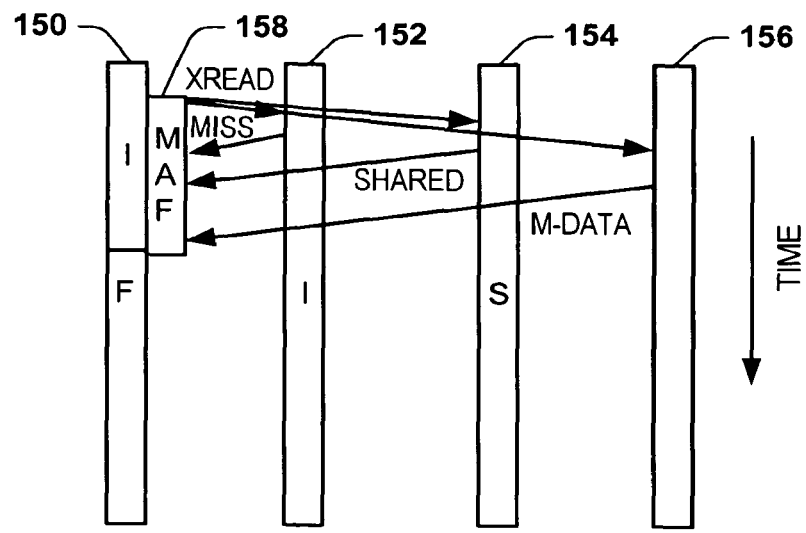
FIG. 4 depicts a first example scenario illustrating state transitions for a coherency protocol.

FIG. 4 illustrates a network that includes a requester or source 150, target nodes 152 and 154 and a home node 156. Initially, nodes 150 and 152 are in an I-state for a particular cache line, the node 154 is in the S-state for the cache line, and the home node 156 contains a memory copy of the data associated with the cache line. Thus, the node 154 and memory 156 both contain a current copy of the data. In this example, the node 150 is a source node that allocates a MAF entry 158 for the data being requested and sends a source broadcast read (XREAD) request to the other nodes 152-156 (e.g., broadcast read line code or broadcast read line data). The node 152 returns a MISS response, indicating that the node does not contain a valid copy of data for the address identified in the request. The node 154 returns a non-data shared response, indicating that the node contains a shared copy of the data. The home for the data returns a copy of the requested data (M-DATA) from memory to the source node 150. After receiving the responses from all other nodes, the source node 150 transitions from the I-state to the F-state. The node 154 remains in the S-state.

Figure 5:
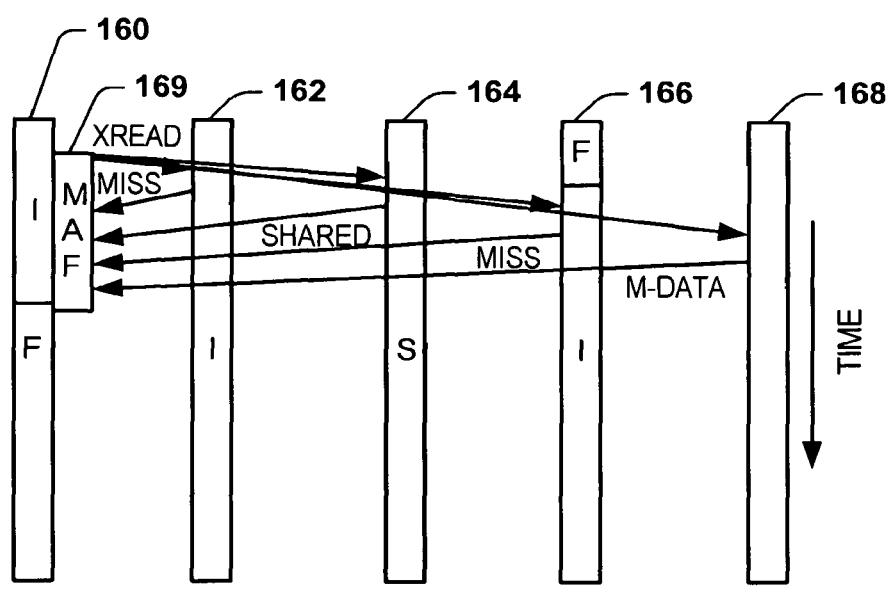
FIG. 5 depicts a first example scenario illustrating state transitions for a coherency protocol.

FIG. 5 depicts another example case that may occur using a coherency protocol in a network that includes a source node 160, a plurality of target nodes 162, 164 and 166 and a home node 168. As an example, the nodes 160 and 162 are initially in the I-state for the given cache line, whereas the node 164 is in the S-state and node 166 is in an F-state. The source node 160 allocates a MAF entry 169 and issues a source broadcast snoop to the other nodes 162-168. Even though the node 166 begins in the F-state, and as such is capable of sending a shared data response, this node transitions from the F-state to the I-state prior to receiving the broadcast snoop from the source 160. Accordingly, the node 166 returns a MISS response, as does the node 162 that was already in the I-state.

The node 164 (being in the S-state) returns a non-data shared response to the source node 160. The home node 168 returns M-DATA to the source node 160, thereby causing the source node to transition from the I-state to the F-state. The node 164 remains in the S-state.

Figure 6:
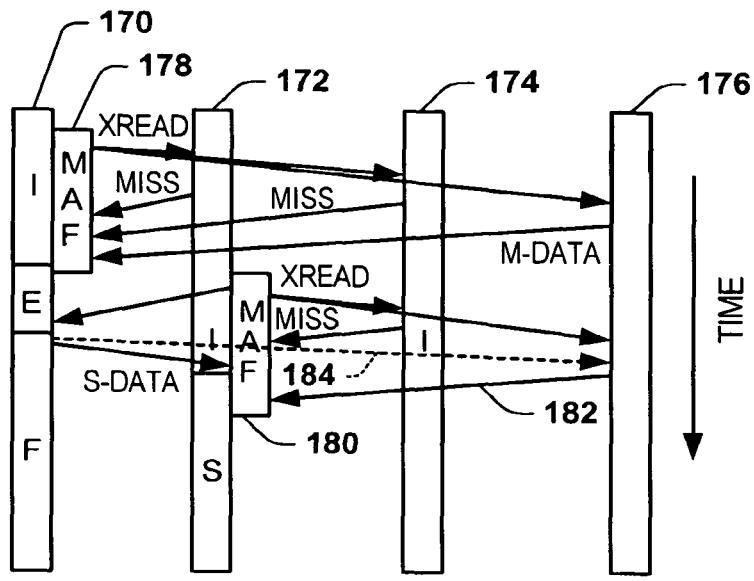
FIG. 6 depicts a second example scenario illustrating state transitions for a coherency protocol.

FIG. 6 depicts another case that can be implemented using a cache coherency protocol. The example depicts a network that includes a source node 170, target nodes 172 and 174 and a home node 176. Initially, each of the source node 170 and target nodes 172 and 174 are in the I-state. To initiate the request, the source node allocates a MAF entry 178 for an address associated with data required by the source node and issues a source broadcast snoop XREAD to the other nodes 172-176 in the network. Each of nodes 172 and 174 (being in the I-state when the snoop is received) returns a non-data MISS response, indicating that neither node contains a valid copy of the data identified by the broadcast snoop. The home node 176 returns M-DATA corresponding to the read request. Since the source node 170 receives only MISSES and the M-DATA, the source node transitions from the I-state to the E-state, indicating that the source node now has an exclusive copy of the data.

Then, the node 172 requires a copy of the same data and becomes a source node. The source node 172 allocates a MAF entry for the same address associated with the data the node 170 received from the home node 176. The node 172 issues a source broadcast snoop XREAD to the other nodes 170, 174 and 176. The node 174 returns a non-data MISS response, as node contains no valid copy of the data associated with the request. Since the node 170 contains an exclusive copy of the requested data at the time the node receives the broadcast read from the node 172, the node 170 returns shared copy of the data (S-DATA) to the node 172. Upon sending the shared copy of data to the node 172, the node 170 can transition from the E-state to the F-state.

The home node 176 also issues a response, indicated at 182, to the snoop from the node 172. The response 182 can either be a data response (M-data) or, alternatively, the response 182 can be a non-data response indicating awareness by the home node 176 that the node 170 is responding with a shared copy of the requested data. The home node 176 can ascertain that node 170 is providing the S-DATA based on a blocking message (indicated at 184) provided by the node 170 substantially concurrently with its response that included the S-DATA. Thus, upon receiving the blocking message from the node 170, the home node 176 is not required to respond with data to the broadcast snoop from the node 172, thereby reducing the bandwidth required to provide the node 172 with desired data. When the node 172 receives the S-data, the node can transition from the I-state to the S-state. Alternatively, the node 170 can transition from the E-state to the S-state upon sending the shared copy of the data to the node 172, with the node 172 transitioning the F-state.

Figure 7:
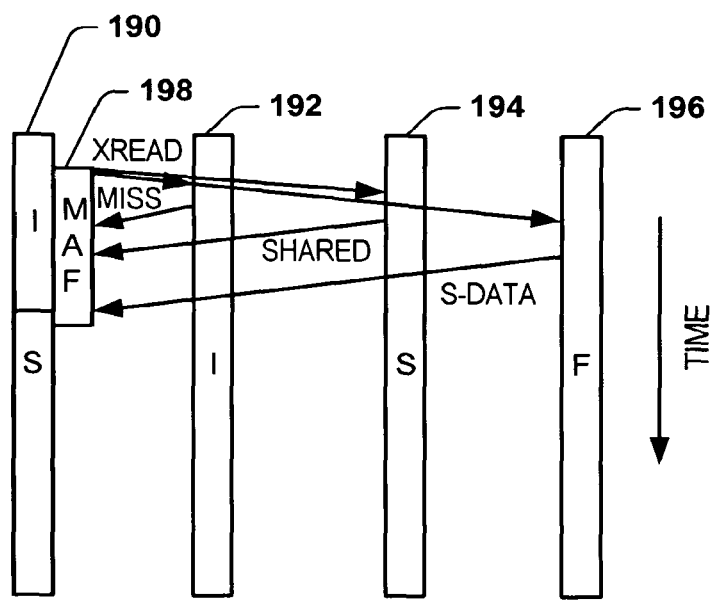
FIG. 7 depicts a third example scenario illustrating state transitions for a coherency protocol.

FIG. 7 depicts another example of a scenario that can be implemented using a cache coherency protocol as described herein. In FIG. 7, the network includes a source node 190 and target nodes 192-196. A home node has been omitted from FIG. 7 for purposes of brevity. In this example, the source node 190 allocates a MAF entry 198 for an address of data required by the node. The source node 190 then issues a source broadcast snoop (e.g., XREAD) to the other nodes 192-196. Each of the other nodes 192-196 responds based on its state at the time when the snoop is received. In particular, the node 192 responds with a non-data MISS response, the node 194 responds with a non-data SHARED response, and the node 196, being in the F-state, responds with a shared copy of the requested data (S-DATA). When receiving the responses, the source node 190 transitions from the I-state to the S-state, indicating that there may be at least one other shared copy of data in the network implementing such protocol, which is the node 196.

Figure 8:
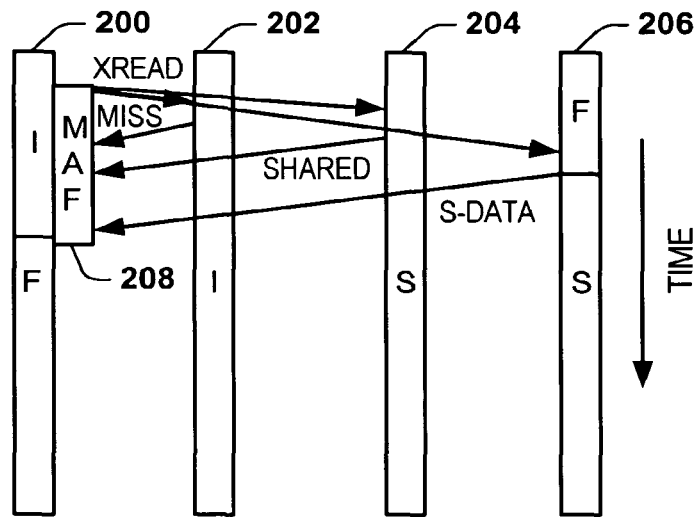
FIG. 8 depicts a fourth example scenario illustrating state transitions for a coherency protocol.

FIG. 8 depicts an example of a different implementation in which the F-state can migrate from one node to another so as to move an ordering point. FIG. 8 depicts a source node 200 and a plurality of target nodes 202, 204 and 206. The source node 200 and the target node 202 are initially in the I-state, whereas the node 204 is in the S-state and the node 206 is in the F-state. The source node 200 allocates a MAF entry 208 for corresponding data and issues a broadcast snoop (XREAD) to the other nodes 202-206. The node 202 responds with a non-data MISS response and the node 204, having a shared copy, responds with a non-data shared response. The other node 206 responds with a shared copy of the data (S-DATA) and transitions from the F-state to the S-state substantially commensurate with its response. In response to receiving the S-DATA from the node 206 and either shared or MISS responds from all other nodes, the source node 200 transitions from the I-state to the F-state. In this way, the F-state can migrate between nodes, such along with the S-data that is being transferred from a node in the F-state to another node requesting a shared copy of such data.

In view of the foregoing examples, those skilled in the art will appreciate that the coherency protocol facilitates accessing shared data by creating an ordering point in cache that can respond with data to non-ownership requests for such data. As a result, the approach enables a decrease in latency by enabling two-hops for a cache hit, instead of a greater number of hops, as is typically required for a directory-based protocol.

Figure 9:
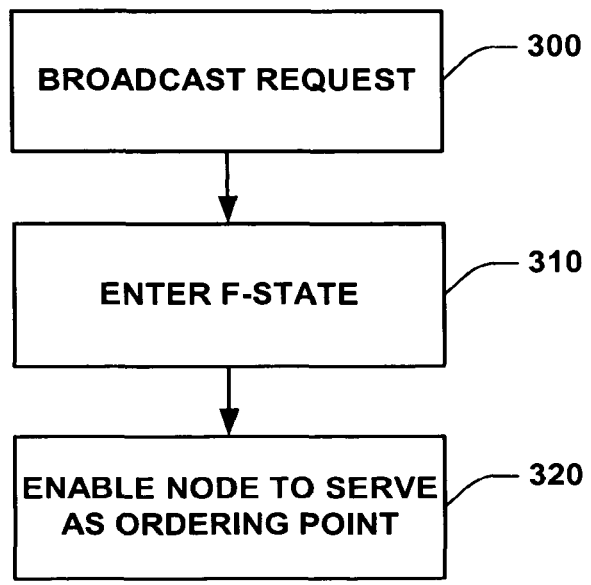
FIG. 9 depicts a flow diagram illustrating a method.

FIG. 9 depicts a method that includes broadcasting a read request for data from a source node to other nodes of an associated system, as shown at 300. The method also includes transitioning the source node into an F-state, at 310, in response to receiving data from memory and receiving non-data responses from other target nodes in the system indicating that the data is shared with at least one of the other target nodes. The method further includes enabling the source node, while in the F-state, to serve as an ordering point in the associated system that is capable of responding to non-ownership requests for the data by providing a shared copy of the data, as shown at 320.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system comprising:
   a plurality of processor nodes for communication with each other;
   a first node of the plurality of processor nodes to transition to a first state in response to receiving a copy of requested data from a memory and receiving a non-data response from another of the plurality of processor nodes, the non-data response including an indication that the another processor node includes a shared copy of the data,
   the first node when operating in the first state to respond to a non-ownership request from a second node of the plurality of processor nodes for the data by (i) sending a response to the second node that includes a shared copy of the data, and (ii) transitioning from the first state to a second state indicating that the data is shared; and
   the second node to transition to a third state in response to receiving the shared copy of the data from the first node, such that the second node becomes an ordering point for providing the shared copy of the data.

2. The system of claim 1, wherein each of the plurality of processor nodes further comprises an associated cache that comprises a plurality of cache lines, each cache line having a respective address that identifies associated data and state information that indicates the state of the associated data for the respective cache line.

3. The system of claim 2, wherein a cache line in one of the first and second states is capable of silently evicting associated data by modifying the state information for the cache line to an invalid state.

4. The system of claim 1, wherein the system is to implement a source broadcast protocol to process requests provided by nodes within a network and, if a particular request fails, the particular request is reissued by a corresponding node using an associated forward progress protocol.

5. The system of claim 4, wherein the forward progress protocol comprises a directory-based protocol.

6. The system of claim 1, wherein the third state and the first state are the same.

7. A computer system, comprising:
   a plurality of processors comprising:
      a source processor to issue a broadcast request for requested data while in a first state; and
      at least one target processor having an associated cache that includes a shared copy of the requested data, the at least one target processor to respond to the broadcast request with a non-data response indicating that the at least one target processor includes the shared copy of the requested data;
   a memory to store the requested data, the memory to respond to the broadcast request with a response that includes a copy of the requested data; and
   the source processor to transition from the first state to a second state in response to receiving the response from the memory and the non-data response from the at least one target processor, the second state enabling the source processor to respond to a request from another of the plurality of processors with a copy of the requested data.

8. The system of claim 7, further comprising at least one other processor having an associated cache that does not include a valid copy of the requested data, the at least one other processor responding to the broadcast request with a response indicating that the at least one other processor does not include a valid copy of the requested data.

9. The system of claim 7, wherein the source processor, after transitioning to the second state, is capable of silently evicting the requested data by returning to an invalid state.

10. The system of claim 7, wherein the broadcast request for the requested data comprises a non-ownership request.

11. The system of claim 10, wherein the non-ownership request comprises a source broadcast read request.

12. The system of claim 7, wherein the system is to implement a source broadcast protocol that defines rules for processing broadcast requests provided by processors within the system and, if a request fails, the system transfers to an associated forward progress directory-based protocol.

13. A method comprising:
broadcasting a read request for data from a source node to other nodes of a system;
transitioning the source node to a first state in response to receiving the data from a memory and receiving a non-data response from a second node in the system indicating that the second node includes a shared copy of the data; and
enabling the source node, while in the first state, to serve as an ordering point for responding to requests for the data from other nodes by providing a shared copy of the data.

14. The method of claim 13, further comprising silently evicting the data from the source node by modifying the state of the data in the source node to an invalid state.

15. The method of claim 13, further comprising moving the ordering point for the data from the source node to another node in response to a non-ownership request for the data provided by the another node.

16. The method of claim 13, wherein the system is a multiprocessor system that includes a plurality of processor nodes, including the source node and the second node, each of the processor nodes comprising a cache that stores data in corresponding cache lines, each cache line having an associated address and state information that defines a state for the data in the corresponding cache line.

17. The method of claim 13, further comprising:
employing a broadcast protocol that defines rules for processing the broadcast read request provided by source node; and
reissuing the read request employing an associated forward progress if the read request broadcast by the source node fails while employing the source broadcast protocol.

18. A method comprising:
broadcasting a read request for data from a source node to other nodes of a system;
transitioning the source node into an F-state in response to receiving the data from a memory and receiving non-data responses from other target nodes in the system indicating that the data is shared with at least one of the other target nodes, wherein the memory comprises a home node for the data requested by the source node;
enabling the source node, while in the F-state, to serve as an ordering point that is capable of responding to non-ownership requests for the data by providing a shared copy of the data;
employing a broadcast protocol that defines rules for processing the broadcast read request provided by source node;
reissuing the read request employing an associated forward progress if the read request broadcast by the source node fails while employing the source broadcast protocol; and
sending an instruction from the source node having the F-state to block the home node from responding with data to a subsequent non-ownership request for the data if the source node provides a response to the subsequent non-ownership request that includes a shared copy of the data.

* * * * *